(12) United States Patent
Togashi

(10) Patent No.: US 7,974,071 B2
(45) Date of Patent: Jul. 5, 2011

(54) MULTILAYER CAPACITOR

(75) Inventor: Masaaki Togashi, Nikaho (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/898,594

(22) Filed: Sep. 13, 2007

(65) Prior Publication Data

US 2008/0074825 A1 Mar. 27, 2008

(30) Foreign Application Priority Data

Sep. 25, 2006 (JP) ................................. 2006-259798

(51) Int. Cl.
*H01G 4/005* (2006.01)
*H01G 4/06* (2006.01)
*H01G 4/20* (2006.01)
(52) U.S. Cl. ...................... 361/303; 361/313; 361/321.2
(58) Field of Classification Search ............... 361/301.2, 361/301.4, 303, 306.1, 306.2, 306.3, 308.1, 361/309, 310, 313, 321.2
See application file for complete search history.

(56) References Cited

U.S. PATENT DOCUMENTS

| 4,556,929 | A | * | 12/1985 | Tanaka et al. | 361/321.2 |
| 4,658,328 | A | * | 4/1987 | Sakabe | 361/309 |
| 5,583,738 | A | * | 12/1996 | Kohno et al. | 361/312 |
| 6,038,121 | A | * | 3/2000 | Naito et al. | 361/303 |
| 6,091,598 | A | * | 7/2000 | Kobayashi | 361/303 |
| 6,385,034 | B2 | * | 5/2002 | Tanaka | 361/306.3 |
| 6,661,640 | B2 | * | 12/2003 | Togashi | 361/306.3 |
| 2003/0026059 | A1 | * | 2/2003 | Togashi | 361/303 |

FOREIGN PATENT DOCUMENTS

| JP | A-06-260364 | | 9/1994 |
| JP | A-10-189390 | | 7/1998 |
| JP | A-2000-114096 | | 4/2000 |
| JP | A 2003-51423 | | 2/2003 |
| JP | A-2004-221153 | | 8/2004 |
| SU | 500547 | A * | 5/1976 |

* cited by examiner

*Primary Examiner* — Eric Thomas
*Assistant Examiner* — David M Sinclair
(74) *Attorney, Agent, or Firm* — Oliff & Berridge, PLC

(57) ABSTRACT

A multilayer capacitor includes a dielectric body 12 formed by stacking a plurality of dielectric layers 12*a*; a first internal conductor layer 21 led out straddling three side faces 12A, 12C and 12D of said dielectric body 12; a second internal conductor layer 22, stacked in the dielectric body 12 via dielectric layers 12*a* to the first internal conductor layer 21, led out straddling three side faces 12B, 12C and 12D; a first and a second terminal electrodes 31 and 32 formed on an outer face of said dielectric body 12, straddling the three side faces 12A, 12C and 12D, and 12B, and 12C and 12D, respectively. A first space pattern 41 is formed on the first lead portion at a position along with the first side face 12A, not connected with the first terminal electrode 31.

3 Claims, 8 Drawing Sheets

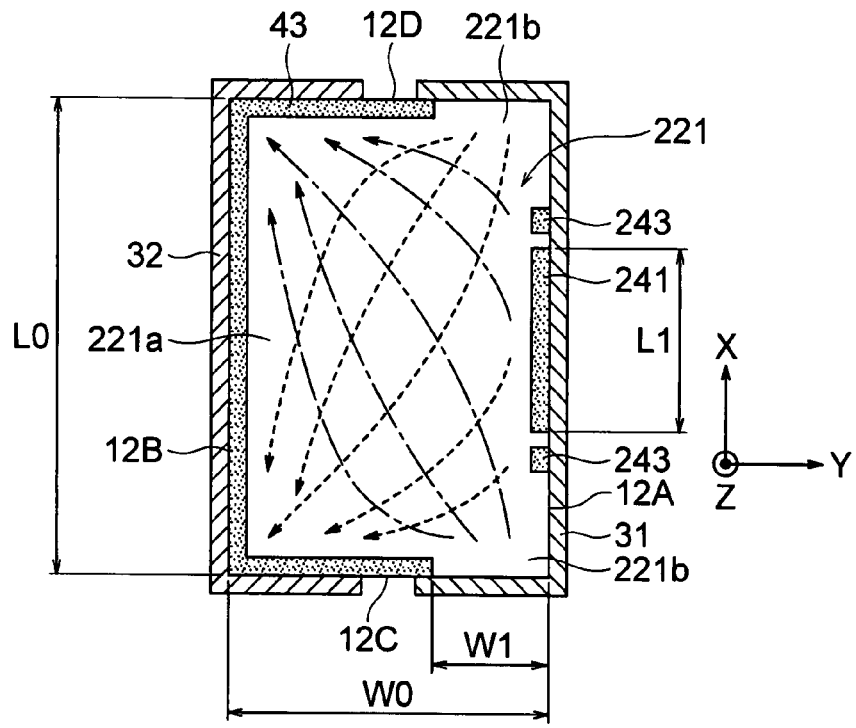
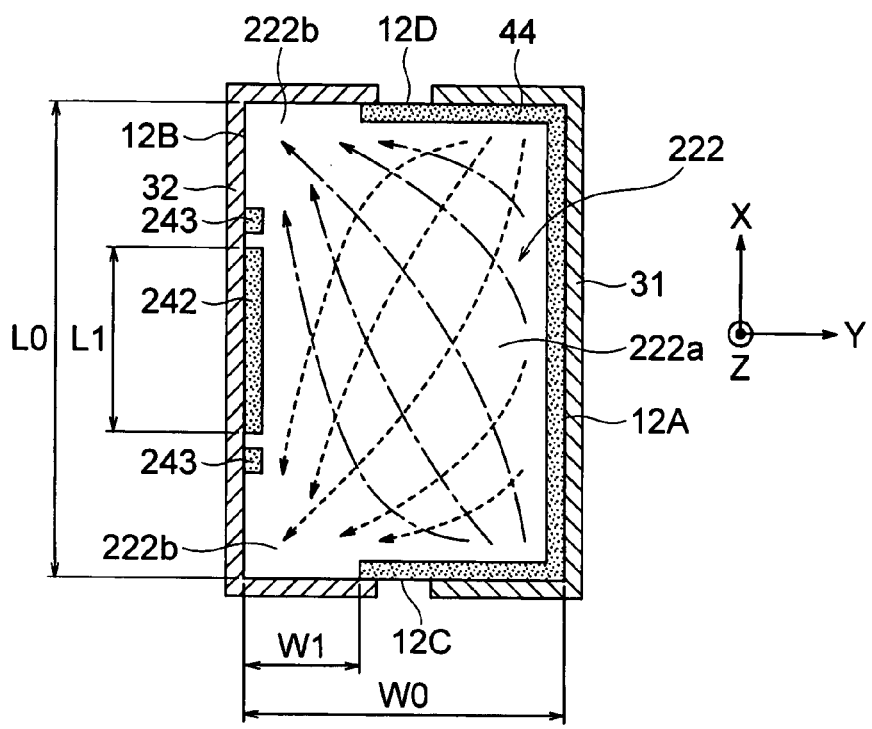

MULTILAYER CAPACITOR

BACKGROUND OF THE INVENTION

1. Field of the Invention

The present invention relates to multilayer capacitor greatly reducing the equivalent serial inductance (ESL), more particularly relates to a multilayer capacitor used as a decoupling capacitor.

2. Description of the Related Art

In recent years, while advances have been made in reducing the voltage of power sources used for supplying power to large-scale integrated circuits (LSI's) and other integrated circuits, the load current has increased.

Therefore, it has become extremely difficult to keep fluctuations in the power source voltage to within tolerances when faced with rapid changes in the load current. Therefore, as shown in FIG. 2, a decoupling capacitor, e.g., a two-terminal structure multilayer ceramic capacitor 100, is now being connected to a power source 102. At the time of transitory fluctuation in the load current, current is supplied from this multilayer ceramic capacitor 100 to the LSI 104 of the central processing unit (CPU) etc. to suppress fluctuation of the power source voltage.

Along with the increasingly higher operating frequencies of today's CPU's, however, the fluctuations in the load current have become faster and larger. The equivalent serial inductance (ESL) of the multilayer ceramic capacitor 100 shown in FIG. 2 itself now has a great impact on fluctuations of the power source voltage.

That is, since the ESL is high in a conventional multilayer ceramic capacitor 100, fluctuation of the power source voltage V easily becomes greater in the same way as above along with fluctuations in the load current i.

That is because the fluctuations in voltage at the time of transition of the load current are approximated by the following equation 1 and therefore the level of the ESL is related to the magnitude of fluctuation of the power source voltage. Further, from equation 1, reduction in the ESL can be said to be linked with stabilization of the power source voltage.

$$dV = ESL \cdot di/dt \qquad \text{equation 1}$$

where,
dV is transitory fluctuation of voltage (V),
i is the fluctuation of current (A), and
t is the time of fluctuation (sec).

As a multilayer capacitor wherein the ESL is reduced, a multilayer capacitor shown in Japanese Unexamined Patent Publication No. 2003-51423 is known. According to this multilayer capacitor, parasitic inductance can be reduced. As a result, the ESL can be reduced. However, it has been required to further reducing the ESL.

Further, as a multilayer capacitor wherein the ESL is reduced, a multi-terminal multilayer capacitor is known. In the multi-terminal multilayer capacitor, by increasing external terminal electrode, current flow varying in direction can be realized in an internal conductor layer. As a result, further reducing of the ESL becomes possible.

However, in the multi-terminal capacitor, there are problems that preparing a plurality of internal conductor layer patterns is necessary, and that increasing number of external terminals results in as well as higher manufacturing cost.

SUMMARY OF INVENTION

An object of the present invention is to provide a multilayer capacitor, not a multi-terminal capacitor, able to greatly reduce the ESL with low manufacturing cost.

To attain the above object, there is provided a multilayer capacitor comprising a dielectric body having an approximately rectangular parallelepiped shape formed by stacking a plurality of dielectric layers;

a first internal conductor layer, arranged inside said dielectric body sandwiched between said dielectric layers, having a first lead portion led out straddling a first longitudinal direction side face and two lateral direction side faces of said dielectric body;

a second internal conductor layer, arranged inside said dielectric body via said dielectric layer to said first internal conductor layer, having a second lead portion led out straddling a second longitudinal direction side face and two lateral direction side faces of said dielectric body;

a first terminal electrode connected to said first lead portion, formed on an outer face of said dielectric body, straddling said first longitudinal direction side face and two lateral side faces; and a second terminal electrode connected to said second lead portion, formed on an outer face of said dielectric body, straddling said second longitudinal direction side face and two lateral side faces, wherein;

a first space pattern is formed on said first lead portion at a position along with said first longitudinal direction side face which is not connected with said first terminal electrode.

According to a multilayer capacitor of the present invention, a first space pattern is formed against a first lead portion of a first internal conductor layer. Accordingly, the first lead portion comprises a pair of branch lead pattern led out from a main body of the first internal conductor layers to two corner portions wherein a first longitudinal direction side face and a lateral direction side face of the dielectric body are crossing. Consequently, in each first internal conductor layer, the current flows are formed from the respective corner portions of the branch lead pattern to diagonal corner portions, respectively, these flows are crossing in a same plane at a main body of the first internal conductor layer.

As a result, the action canceling out the magnetic field is occurred at current flow crossing position, so that parasitic inductance can be smaller, effect of reducing the equivalent serial inductance is occurred.

Also, in the present invention, the first terminal electrode and the second terminal electrode are facing each other in a lateral direction. As a result, a distance between the terminals becomes shorter and the ESL is further reduced. Also, even though the first space pattern is formed on the first lead portion in order to form the first terminal electrode and the second terminal electrode along with each longitudinal side face of a dielectric body, connecting length between each lead portion and each terminal electrode can be secured sufficiently.

Further, by arranging pluralities of two kinds of the first and the second internal conductor layers in the dielectric body, not only does the electrostatic rise, but also the action canceling out the magnetic field becomes greater, the inductance is more greatly reduced, and the ESL is reduced further.

That is, according to the multilayer capacitor of the present invention, a great reduction in the ESL of the multilayer capacitor is achieved, fluctuation of the power source voltage can be suppressed, and it can be suitably for use as a decoupling capacitor, etc.

Preferably, said first space pattern is formed at a center position of said first longitudinal direction side face. This constitution results in a pair of branch lead patterns in the first lead portion having symmetric form, and the crossing currents easily having symmetric form, so that the effect of canceling out the magnetic field becomes greater.

Preferably, in case that a longitudinal width of said first space pattern is L1, and a longitudinal width of said dielectric body is L0, a ratio of L1/L0 is within a range of 0.2 to 0.5. When this ratio is too small or too large, crossing phenomenon of the current in an identical plane tends to reduce.

Preferably, in case that a width of the first lead portion led out to the lateral direction side face of said dielectric body is W1, and a width of lateral direction of said dielectric body is W0, a ratio of W1/W0 is within a range of 0.15 to 0.45. When this ratio is too small, a contact area of the first lead portion and the first terminal electrode becomes smaller, and also, crossing phenomenon of the current in an identical plane tends to become reducing. Further, when this ratio is too large, there is a possibility for the first lead portion to short circuit to the second terminal electrode.

Preferably, in case that a longitudinal width of said dielectric body is L0, and a width of lateral direction of said dielectric body is W0, a ratio of L0/W0 is within a range of 1 to 5, more preferably, within a range of 1.6 to 3. In the case of this ratio, the first terminal electrode and the second terminal electrode become easily facing each other in a lateral direction. Note that when this ratio is too large, crossing phenomenon of the current in an identical plane tends to be hardly occurred.

In said first lead portion, other space patterns may be formed along with said first longitudinal direction side face, other than said first space pattern.

Preferably, a plane pattern of said first internal conductor layer having said first space pattern is line symmetry pattern to a centerline passing through a longitudinal middle portion of said dielectric body. By applying this constitution, the crossing currents symmetric in an identical plane, and the effect of canceling out the magnetic field becomes greater.

Preferably, a second space pattern which is not connected to said second terminal electrode is formed on said second lead portion, at a position along with said second longitudinal direction side face. In a second lead portion, by forming the second space pattern, a pair of branch lead patterns is formed as with the first lead portion, and the crossing phenomenon of the current in an identical plane is occurred in the second internal conductor layer. As a result, the ESL can be reduced further.

Preferably, said second space pattern and said first space pattern have same shape and same size. Preferably, said first internal conductor layer and said second internal layer have an identical plane pattern when rotating 180 degrees. By applying such constitution, the crossing pattern of the current in each plane becomes almost the same, in the first internal conductor layer and the second internal conductor layer, so that the ESL can be reduced further.

Note that in the present invention, the first internal conductor layer and the second internal conductor layer are relative concepts, and the first internal conductor layers and the second internal conductor layers may be converse. Also, other "the first . . . " and "the second . . . " are similar.

BRIEF DESCRIPTION OF THE DRAWINGS

Below, the present invention will be described based on the following embodiments shown in drawings as follows;

FIG. 6A and FIG. 6B are plane views of a first internal conductor layer and a second internal conductor layer of a multilayer capacitor according to other further embodiments of the present invention.

DESCRIPTION OF THE PREFERRED EMBODIMENTS

First Embodiment

Figure 1:
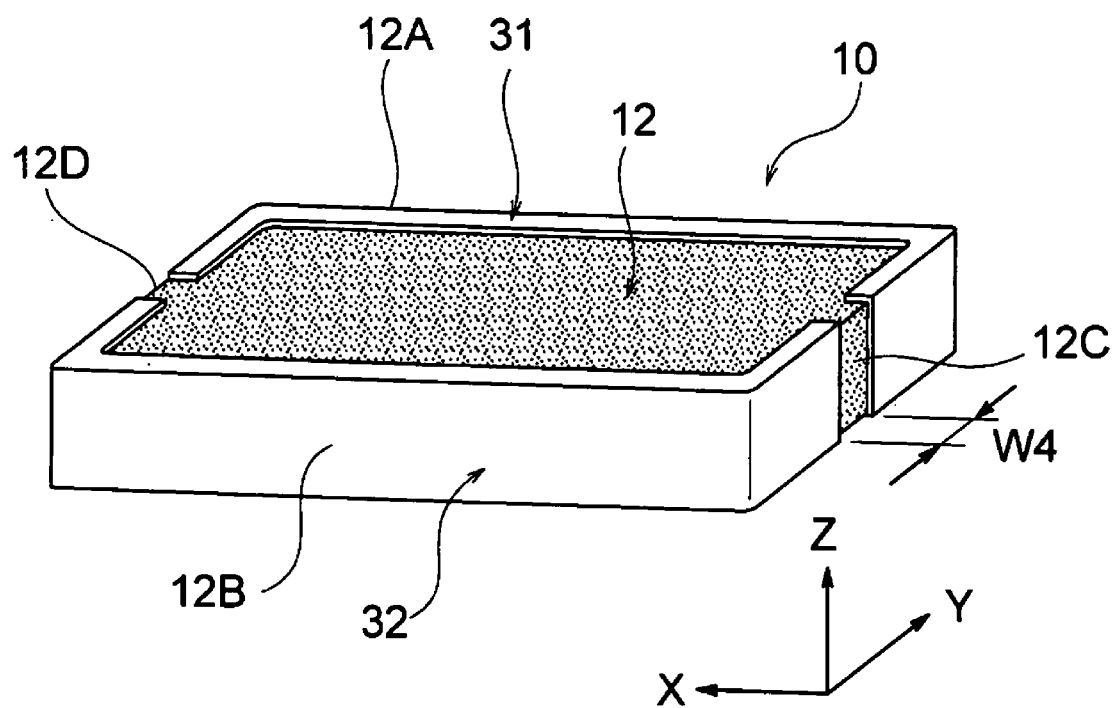
FIG. 1 is a perspective view of a multilayer capacitor in one embodiment of the present invention.

As shown in FIG. 1, a multilayer capacitor 10 comprises a dielectric body 12, a rectangular parallelepiped shaped sintered body, obtained by firing a stack of a plurality of ceramic green sheets as dielectric layers.

The dielectric body 12 comprises a first longitudinal direction side face 12A and a second longitudinal direction side face 12B opposed each other and lateral direction side faces 12C and 12D opposed each other connecting these longitudinal direction side faces 12A and 12B. On an external surface of the dielectric body 12, a first terminal electrode 31 is formed straddling the first longitudinal direction side face 12A and the two lateral direction side faces 12C and 12D. Further, a second terminal electrode 32 is formed straddling the second longitudinal direction side face 12B and the two lateral direction side faces 12C and 12D.

Figure 2:
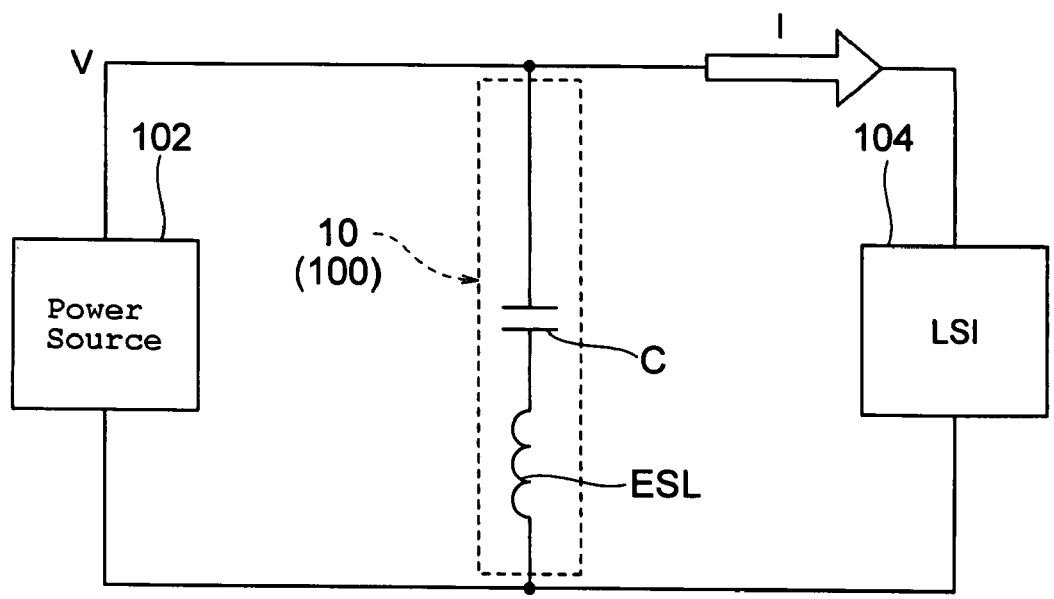
FIG. 2 is a circuit diagram wherein a multilayer ceramic capacitor is installed.

The multilayer capacitor 10 is connected to a circuit as shown in FIG. 2 for example, and is used as a decoupling capacitor, etc.

Figure 3:
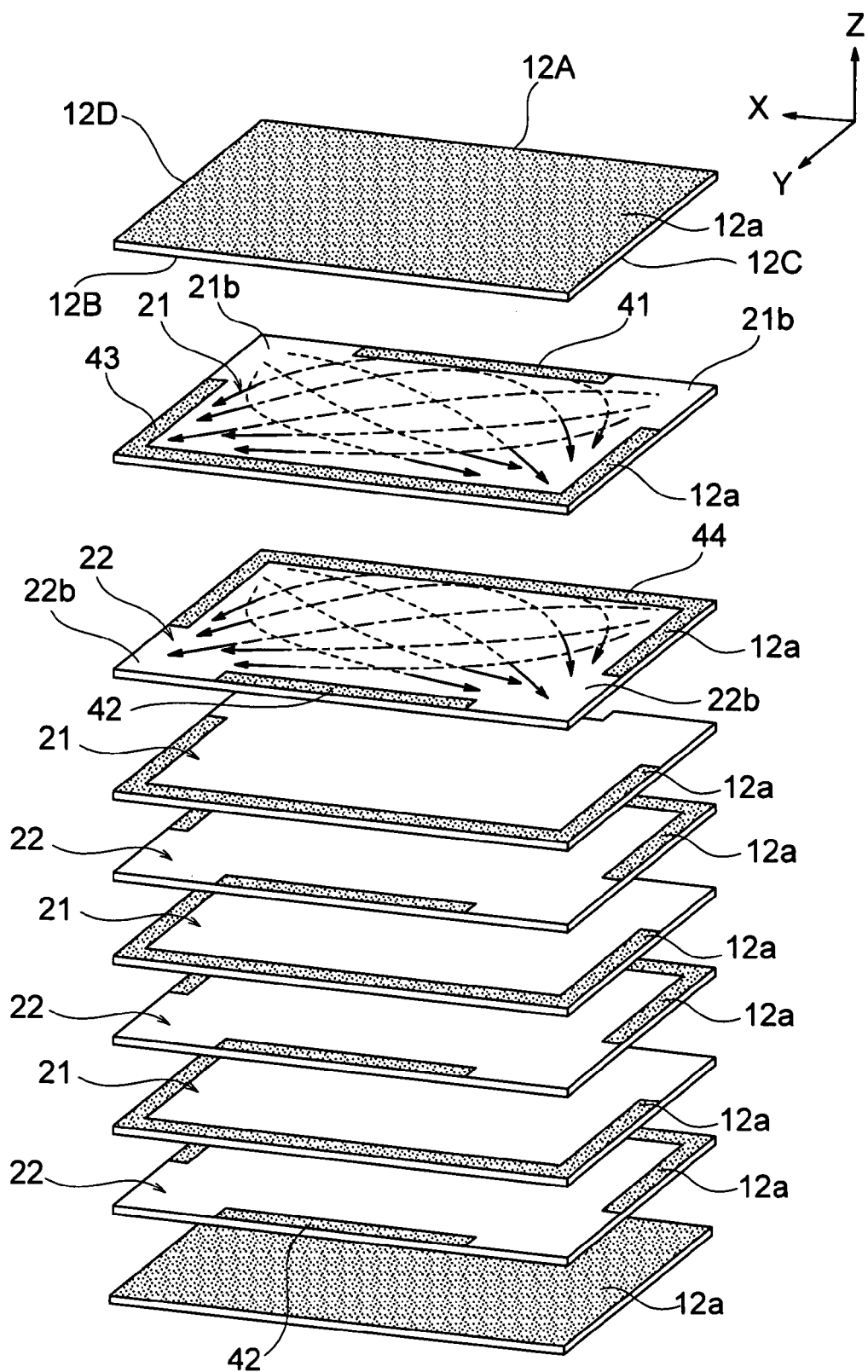
FIG. 3 is an exploded view of the multilayer capacitor shown in FIG. 1.

As shown in FIG. 3, in the dielectric body 12, the first internal conductor layer 21 thinly extending along with a longitudinal direction X of the dielectric body 12 and the second internal conductor layer 22 thinly extending along with the longitudinal direction X of the dielectric body 12 are arranged. Then, a plurality of internal conductor layers 21 and 22 are stacked so as to be alternately arranged between adjacent layers (in the drawing, 8 layers in total), and dielectric layers 12a are arranged between the respective internal conductor layers 21 and the internal conductor layers 22.

Namely, in the present embodiment, four each of the first and the second conductor layers 21 and 22 are alternately arranged in the dielectric body 12, in a manner sandwiched between the dielectric layers 12a. Note that, as the material of these internal conductor layers 21 and 22, as well as base metal materials such as nickel, nickel alloy, copper, or copper alloy, materials having these metals as main component may be considered.

As shown in FIG. 3, the first internal conductor layer 21 has a shape corresponding to an external shape of the dielectric layer 12a, and an internal conductor layer body portion 21a apart from circumferential end portions of the dielectric layer 12a with a predetermined insulation space pattern 43. This internal conductor layer body portion 21a is a part of composing one of electrodes of a capacitor. The internal conductor layer 21 is formed integrally with the internal conductor layer body portion 21a on an identical plane, and further comprises a first lead portion led out straddling three side faces, 12A, 12C and 12D adjacent to each other, of the dielectric body 12.

Figure 4A:
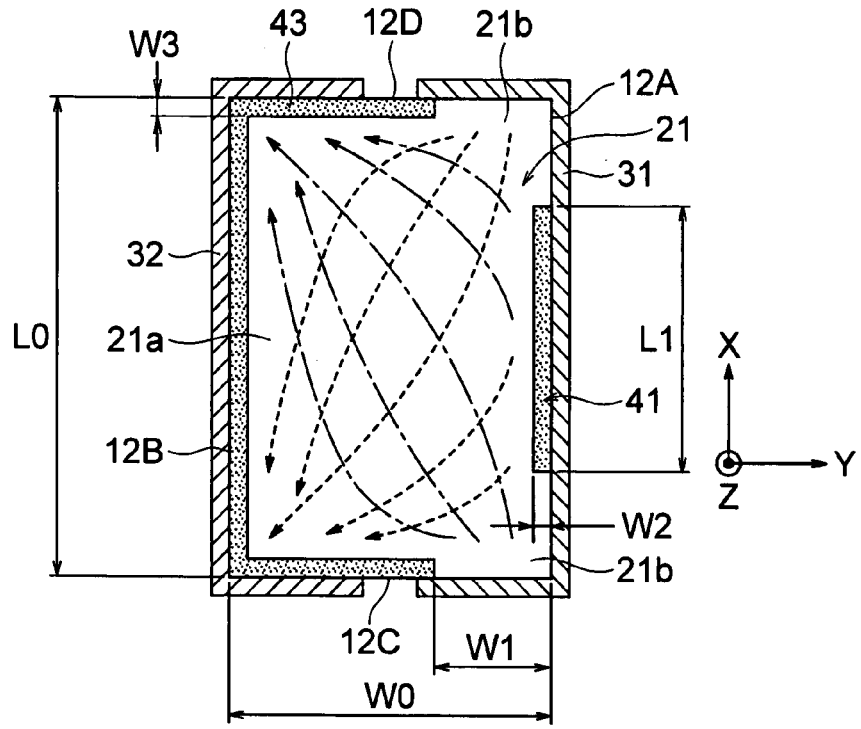
FIG. 4A and FIG. 4B are plane views of a first internal conductor layer and a second internal conductor layer shown in FIG. 3, respectively.

As shown in FIG. 4A, in the present embodiment, in the first lead portion, the first space pattern 41 which is not connected to the first terminal electrode 31 is formed at a center position along with the first longitudinal direction side face 12A. Consequently, the first lead portion comprises a pair of branch lead patterns 21b led out from a main body 21a of the first internal conductor layer 21 to two corner portions wherein the first longitudinal direction side face 12A and the lateral side faces 12C and 12D of the dielectric body 12 are crossing.

In case that a width of the lateral direction Y of the dielectric body 12 is W0, the width W1 of the lateral diction Y of the branch lead pattern 21b of the first lead portion is determined so that a ratio of W1/W0 is within a range of 0.15 to 0.45, preferably 0.25 to 040.

Also, in case that a width of the longitudinal direction X of the dielectric body 12 is L0, the width L1 of the longitudinal direction of the first space pattern 41 is determined so that a ratio of L1/L0 is within a range of 0.2 to 0.5, preferably 0.3 to 0.45.

In the present embodiment, the first space pattern 41 is formed at a center position of a longitudinal direction X of the first longitudinal direction side face 12A of the dielectric body 12. An insulation space pattern 43 is formed continuously straddling the second longitudinal direction side face 12B, and the lateral side faces 12C and 12D of the dielectric body 12, and both end portions of the longitudinal direction of the space pattern 43 contact to the branch lead pattern 21b of the first lead portion. In the present embodiment, a plane pattern of the first internal conductor layer 21 is a line symmetrical pattern to a centerline passing through a center position of the longitudinal direction X of the dielectric body 12.

The first terminal electrode 31 is formed so as to straddle three side faces, the first longitudinal direction side face 12A, and the lateral direction side faces 12C and 12D, and both end portions of respective lateral direction side faces 12C and 12D in the first terminal electrode 31 extend to a position beyond the width W1 of the lateral direction Y in the branch lead pattern 21b.

The width of a space W2 of the first space pattern 41 is comparable to the width of space W3 of the insulating space 43, and preferably, 100 to 200 μm or so. If these electrode widths W2 and W3 are too small, the insulation properties with each terminal electrode 31 or 32 is liable to be insufficient; when too large, an area of the main body portion 21a will be narrower and an ability as capacitor is liable to decline.

As shown in FIG. 3, the other second internal conductor layer 22 has a shape corresponding to an external shape of the dielectric layer 12a, and an internal conductor layer body portion 22a apart from circumferential end portions of the dielectric layer 12a with a predetermined insulation space pattern 44. This internal conductor layer body portion 22a is a part of composing the other electrode of a capacitor. The internal conductor layer 22 is formed integrally with the internal conductor layer body portion 22a on an identical plane, and further comprises a second lead portion led out straddling three side faces, 12B, 12C and 12D adjacent to each other, of the dielectric body 12.

Figure 4B:
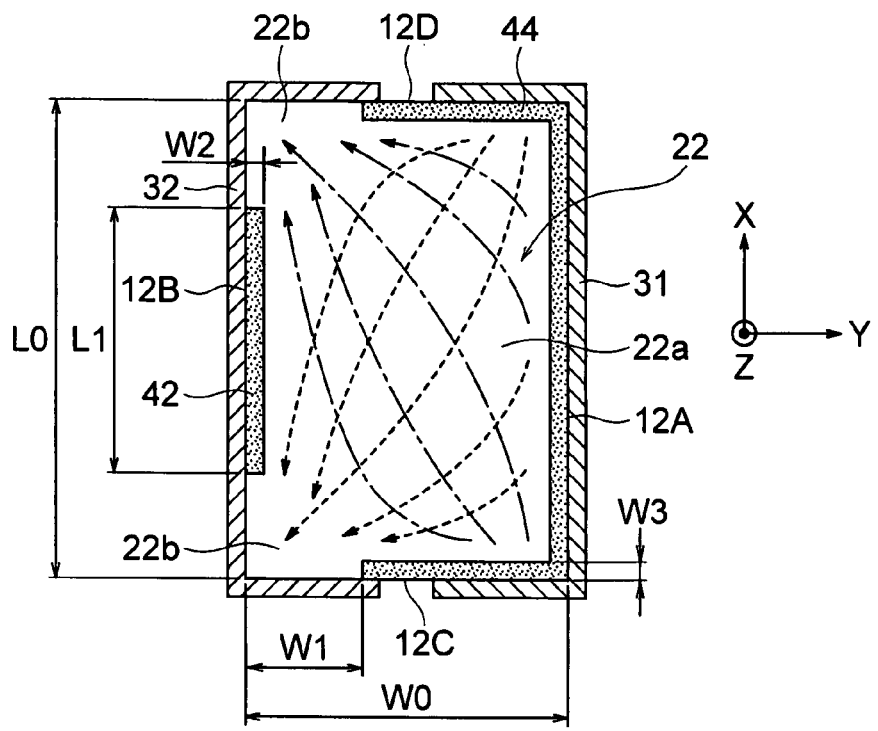

As shown in FIG. 4B, in the present embodiment, in the second lead portion, the second space pattern 42 which is not connected to the second terminal electrode 32 is formed at a center position along with the second longitudinal direction side face 12B. Consequently, the second lead portion comprises a pair of branch lead patterns 22b led out from a main body 22a of the second internal conductor layer 22 to two corner portions wherein the second longitudinal direction side face 12B and the lateral side faces 12C, 12D of the dielectric body 12 are crossing.

In this embodiment, a shape of the second internal conductor layer 22a is a 180 degree-rotated pattern of the first internal conductor layer 21a, having similar dimensions (L0, L1, W1, W0, W2 and W5).

From the above relation of the dimensions, the lead patterns 21b and 22b formed on the two types of the first and the second internal conductor layers 21 and 22 respectively are arranged in a positional relationship not overlapping when projected in the stacking direction Z of the dielectric layer 12a. The respective body portions 21a and 22a are overlapping when projected in the stacking direction Z of the dielectric layer 12a to compose a capacitor through the dielectric layer 12a.

As shown in FIG. 1, a pair of terminal electrodes 31 and 32 are spaced with width W4 along with Y-direction on the opposed lateral side faces 12C and 12D of the body 12 so as to be insulated each other. The width of W4 is preferably 0.3 to 0.5 mm.

The multilayer capacitor 10 of the present embodiment is a two-terminal structure multilayer capacitor wherein the terminal electrodes 31 and 32 are arranged on all four side faces 12A to 12D of the dielectric body 12 as a hexahedron (a rectangular parallelepiped).

Next, function of the multilayer capacitor 10 according to the present embodiment is specified.

According to the multilayer capacitor 10 of the present embodiment, two types of internal conductor layers 21 and 22 are alternately arranged in a manner sandwiched between the dielectric layers in a dielectric body 12 formed into a rectangular parallelepiped shape by stacking a plurality of dielectric layers. These two types of the internal conductor layers 21 and 22 are arranged in a positional relationship not overlapping when projected in the stacking direction of the dielectric layer and are led out straddling three side faces of the dielectric body 12. Further, the two types of the terminal electrodes 31 and 32 are arranged at the outside of the dielectric body 12 straddling three side faces of the dielectric body 12. These two terminal electrodes 31 and 32 are connected to either of the two types of the internal conductor layers 21 and 22.

Furthermore, in the multilayer capacitor 10 according to the present embodiment, a first space pattern 41 is formed to the first lead portion of the first internal conductor layer 21. Consequently, the first lead portion comprises a pair of branch lead patterns 21a led out from a main body 21a of the first internal conductor layer 21 to two corner portions wherein the first longitudinal direction side face 12A and the lateral side faces 12C and 12D of the dielectric body are crossing. Consequently, in the first internal conductor layer 21, the current flows are made from corner portions of the respective branch lead pattern 21b to respective diagonal corner portions, these flows are crossing in an identical plane at the main body 21a of the first internal conductor layer 21.

Similarly, in each of the second internal conductor layers 22, the current flow is made from corner portions of the respective branch lead pattern 22b to respective diagonal corner portions, and these flows are crossing in an identical plane at the main body 22a of the internal conductor layer 22.

As a result, an action canceling out the magnetic field rises at positions where the currents are crossing, along with this, the effects arise that the parasitic inductance of the multilayer capacitor 10 itself can be reduced and the ESL is reduced.

Further, in the present embodiment, since the first terminal electrode 31 and the second terminal electrode 32 are mutually opposed in the lateral direction Y, a distance between the terminals become shorter, so that a reduction in the ESL of the multilayer capacitor is achieved at this point as well. Further, even though forming the space patterns 41 and 42 at each lead portion in order to form the first terminal electrode 31 and the second terminal electrode 32 along with the first and the second longitudinal direction side faces 12A and 12B respectively, contact lengths of the branch lead patterns 21b and 22b of each lead portion and each of the terminal electrodes 31 and 32 can be secured sufficiently.

Further, in the present embodiment, by arranging pluralities of the two types of the first and the second internal conductor layers 21 and 22 in the dielectric body 12, not only does the electrostatic capacitance rise, but also the action canceling out the magnetic field becomes a greater, the inductance is more greatly reduced, and the ESL is further reduced.

That is, according to the multilayer capacitor of the present embodiment, a great reduction in the ESL of the multilayer capacitor 10 is achieved, fluctuation of the power source voltage can be suppressed, and it can be suitably used as a decoupling capacitor, etc. as shown in FIG. 2.

Second Embodiment

Next, a second embodiment of the present invention will be explained on the basis of FIG. 6A and FIG. 6B. Note that identical numbers are given to the identical members of the first embodiment, and overlapping explanation will be omitted.

Figure 5A:
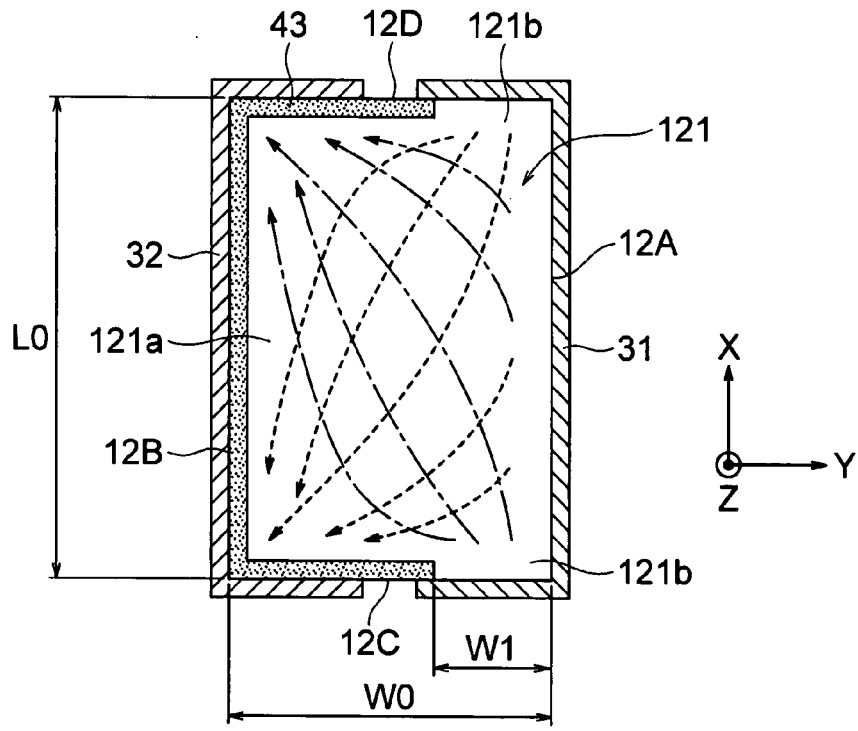
FIG. 5A and FIG. 5B are plane views of a first internal conductor layer and a second internal conductor layer of a multilayer capacitor according to other embodiments of the present invention.
Figure 5B:
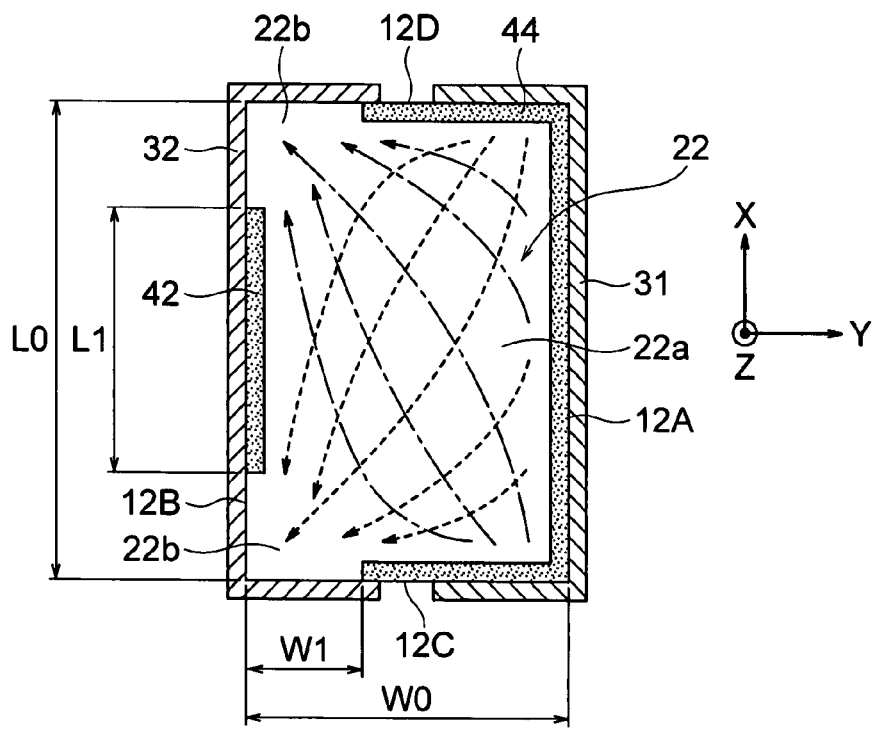

In the present embodiment, other than substituting the first internal conductor layer 21 of the first embodiment with a first internal conductor layer 121 shown in FIG. 5A, a multilayer capacitor is composed in the same way as in the first embodiment. In the present embodiment, while the second space pattern 42 is formed only on the second internal conductor layer 22, the first space pattern is not formed on the first internal conductor layer 121.

In the present embodiment, the first internal conductor layer 121 comprises an internal conductor layer body portion 121a corresponding to the first internal conductor layer body portion 21a of the first embodiment, and continuous lead out portion 121b corresponding to a pair of the branch lead pattern 21b in the first lead portion. The continuous lead out pattern 121b of the first lead portion is connected to whole internal face of the first terminal electrode 31.

In the multilayer capacitor according to the present embodiment, the cross over current similar to the first embodiment can be expected in the first internal conductor layer 121 in response to the current flow in the second internal conductor layer 22 stacked via dielectric layer 12a. As a result, it is slightly inferior to those in the first embodiment, almost similar actions and effects can be expected.

Third Embodiment

Next, a third embodiment of the present invention will be explained on the basis of FIG. 6A and FIG. 6B. Note that identical numbers are given to the identical members of the first embodiment, and overlapping explanation will be omitted.

In the present embodiment, other than substituting the first internal conductor layer 21 and the second internal conductor layer 22 of the first embodiment with a first internal conductor layer 221 shown in FIG. 6A and a second internal conductor layer 222 shown in FIG. 6B, a multilayer capacitor is composed in the same way as in the first embodiment.

In the present embodiment, at a point that the internal conductor layer 221 comprises an internal conductor layer body portion 221a corresponding to the first internal conductor layer body portion 21a of the first embodiment, a branch lead pattern 221b corresponding the branch lead pattern 21b, and a first space pattern 241 corresponding to the first space pattern 41, the first internal conductor layer 221 is similar to the first internal conductor layer 21. However, the first internal conductor layer 221 is different from the first internal conductor layer 21 of the first embodiment at a point that other small space patterns 243 are formed at both ends of the first space pattern 241.

Further, in the present embodiment, at a point that the second internal conductor layer 222 comprises an internal conductor layer body portion 222a corresponding to the second internal conductor layer body portion 22a of the first embodiment, a branch lead pattern 222b corresponding to the branch lead pattern 22b, and a second space pattern 242 corresponding to the second space pattern 42, the second internal conductor layer 222 is similar to the second conductor layer 22. However, the second internal conductor layer 222 is different from the second internal conductor layer 22 of the first embodiment at a point that other small space patterns 243 are formed at both ends of the second pattern 242.

In the multilayer capacitor according to the present embodiment, the cross over current similar to the first embodiment can be expected in the internal conductor layers 221 and 222. As a result, it is slightly inferior to those of the first embodiment, almost similar actions and effects can be expected.

Fourth Embodiment

Next, a fourth embodiment of the present invention will be explained on the basis of FIG. 7A to 7D. Note that identical numbers are given to the identical members of the first embodiment, and overlapping explanation will be omitted.

Figure 7A:
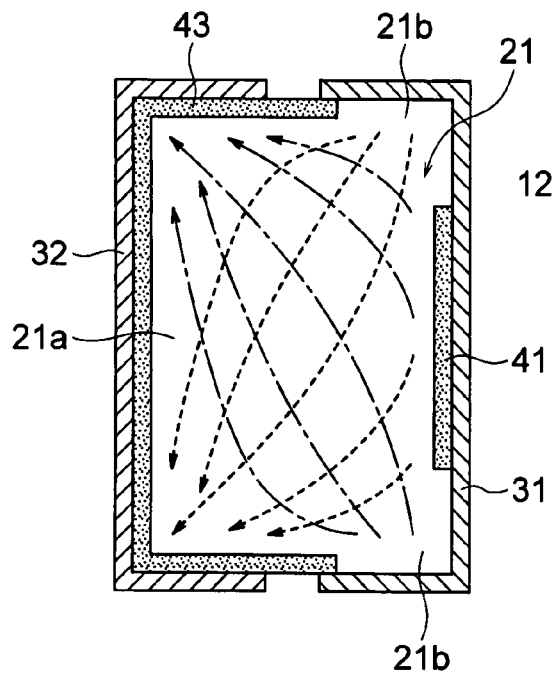
FIG. 7A to FIG. 7D are plane views of a first to a fourth internal conductor layers of a multilayer capacitor according to other further embodiments of the present invention.
Figure 7B:
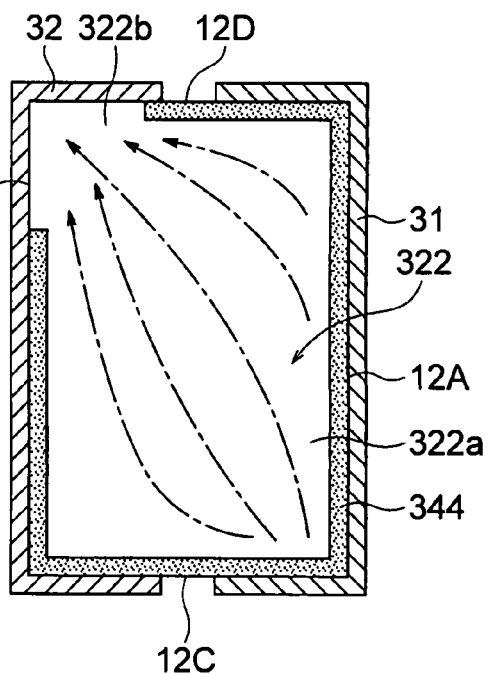
Figure 7C:
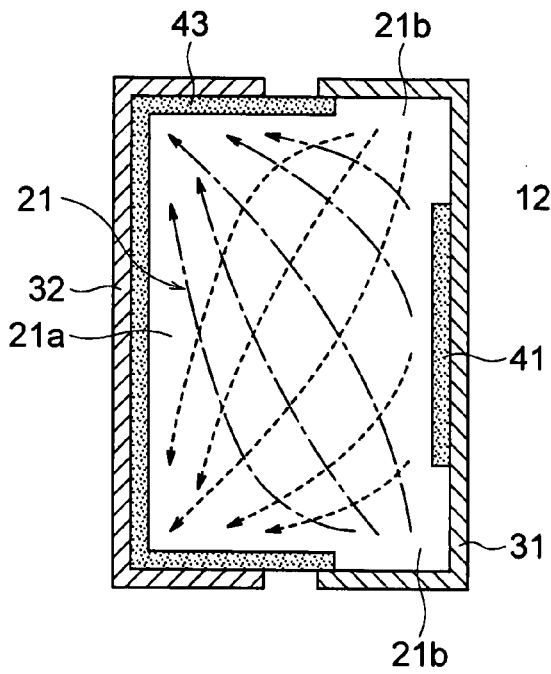
Figure 7D:
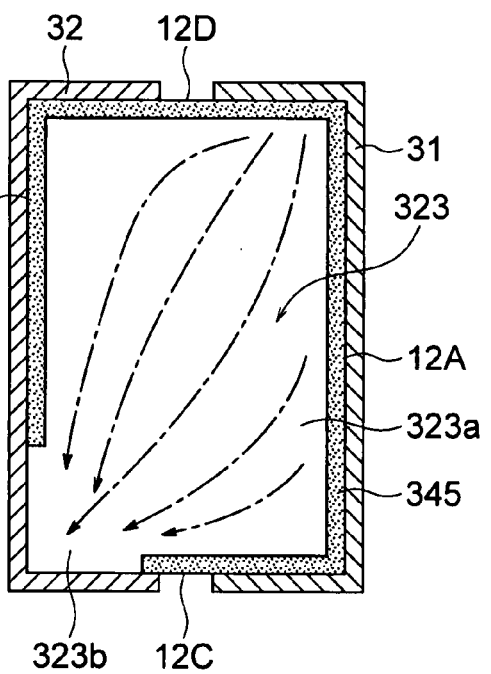

In the present embodiment, other than substituting the second internal conductor layer 22 of the first embodiment with two kinds of a second internal conductor layer 322 shown in FIG. 7B and a second internal conductor layer 323 shown in FIG. 7D, a multilayer capacitor is composed in the same way as in the first embodiment.

In the present embodiment, the second internal conductor layer 322 shown in FIG. 7B is stacked via the dielectric layer 12a below the first internal conductor layer 21 shown in FIG. 7A which is the same as in the first embodiment, and the first conductor layer 21 which is the same as in the first embodiment shown in FIG. 7C is stacked via the dielectric layer 12a below the second internal conductor layer 322. Then, the second internal conductor layer 323 shown in FIG. 7D is stacked via the dielectric layer 12a below the first conductor layer 21. Below this, the stacking the conductor layers 21, 322, 21, 323 stated above shown in FIG. 7A to FIG. 7D is repeated.

In the present embodiment, the second internal conductor layer 322 comprises an internal conductor layer body portion 322a corresponding to a main body 22a of the second internal conductor layer according to the first embodiment, and a single lead pattern 322b corresponding to a branch lead pattern 22b. The single lead pattern 322b is only connected to the second terminal electrode 32 positioned at a corner portion where the second longitudinal direction side face 12B and the fourth lateral direction side face 12C are crossing.

In order to form the single lead pattern 322b only, an insulating space pattern 344 that is continued in the area without the lead pattern 322b, is formed around the internal conductor layer body portion 322a.

On the other hand, the second internal conductor layer 323 comprises an internal conductor layer body portion 323a corresponding to the main body 22a of the second internal conductor layer according to the first embodiment, and a single lead pattern 323b corresponding to the branch lead pattern 22b. The single lead pattern 323b is only connected to the second terminal electrode 32 positioned at a corner at which the second longitudinal direction side face 12B and the third lateral longitudinal side face 12C is crossing.

In order to form the single lead pattern 323b only, an insulating space pattern 345 that is continued in the area without the lead pattern 323b, is formed around the internal conductor layer body portion 323a.

In the multilayer capacitor according to the present embodiment, the cross over current similar to the first embodiment can be expected to flow in the first conductor layer 321. Further, in two types of the second internal conductor layers 322 and 323, the diagonal current flows can be realized through the respective single lead pattern 322b or 323b. In between the two types of the second internal conductor layer 322 and 323 each other, the current flows are crossing.

Accordingly, comparing with the first embodiment, although the cross over current is not formed on each identical plane of the second internal conductor layer 322 or 323, flowing of the cross over current similar to the first embodiment can be expected in the first conductor layer 321. As a result, while it is slightly inferior to the first embodiment, actions and effects almost similar to those of the first embodiment can be expected.

Note that the present invention is not limited to the above embodiments and may be variously modified within the scope of the present invention.

For example, in the multilayer capacitor of the present invention, the number of staking layers is not particularly limited, and it is possible to provide tens or hundreds of layers. Further, in the present invention, the first space pattern and the second space pattern may not necessarily continue in a longitudinal direction but may be intermittently formed.

EXAMPLE

Next, the present invention will be further explained based on specific example, but the present invention is not limited to this example. In the present example, the following ESL of respective capacitor samples have been found by converting from S parameter to impedance by using impedance analyzer.

Firstly, each capacitor sample is explained. A two-terminal type multilayer capacitor according to the embodiment shown in FIG. 1 to FIG. 4 is a sample Ex1. Further, a capacitor formed in the same way as in the sample Ex1 other than not comprising the first space pattern 41 and the second space pattern 42 is a sample Cex1. The ESL of each sample has been measured.

Figure 8:
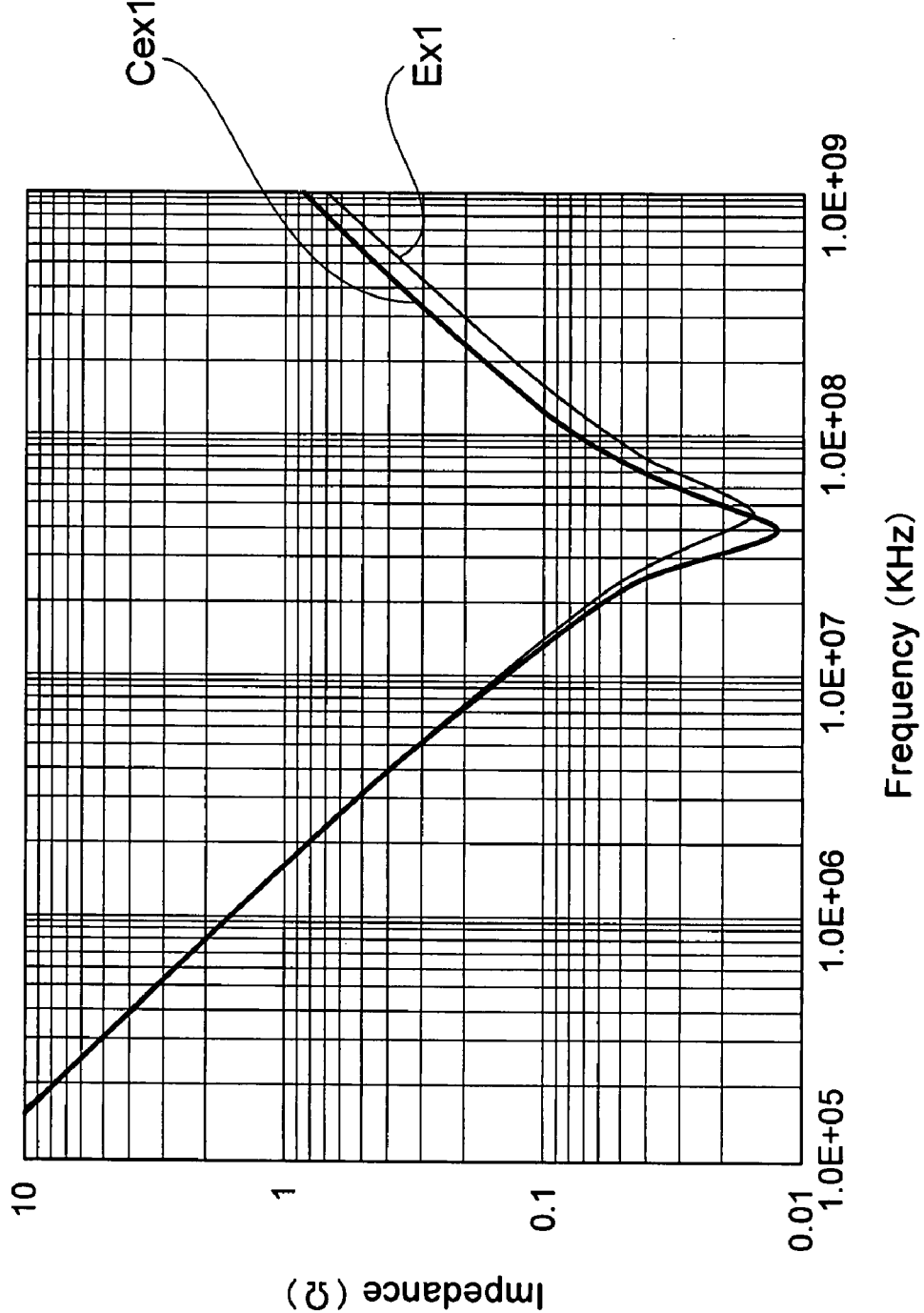
FIG. 8 is a graph of impedance characteristics of examples and comparative examples of the present invention.

As a result of this, impedance properties of each sample are measured. The results are shown in FIG. 8. As shown in a chart of FIG. 8, at a high frequency side, it was confirmed that a value of impedance of the sample Ex1 becomes smaller than that of the sample Cex1. Further, when measuring the ESL, the ESL is 119 pH in the sample Ex1, and the ESL is 140 pH in the sample Cex1. Namely, it was confirmed that the ESL is greatly reduced in the sample Ex1 according to the present embodiment of the present invention.

Note that the ESL is obtained from the following equation:

$$2\pi f_o = 1/\sqrt{(ESL \cdot C)}$$

where $f_o$ is the self resonant frequency, and C is the electrostatic capacity.

As the dimensions of the samples used here, in FIG. 4, L0=1.6 mm, L1=0.8 mm, W0 is 0.8 mm, W1=0.25, and W2=W3=0.15 mm. The number of stacking layers of the internal conductor layer is 25 in total, and the electrostatic capacity was 0.1 µF.

The invention claimed is:

1. A multilayer capacitor comprising:
    a dielectric body having an approximately rectangular parallelepiped shape formed by stacking a plurality of dielectric layers;
    a first internal conductor layer, arranged inside said dielectric body sandwiched between said dielectric layers, having a first lead portion led out straddling a first longitudinal direction side face and two lateral direction side faces of said dielectric body;
    a second internal conductor layer, arranged inside said dielectric body via said dielectric layer to said first internal conductor layer, having a second lead portion led out straddling a second longitudinal direction side face and two lateral direction side faces of said dielectric body;
    a first terminal electrode connected to said first lead portion, formed on an outer face of said dielectric body, straddling said first longitudinal direction side face and two lateral side faces; and
    a second terminal electrode connected to said second lead portion, formed on an outer face of said dielectric body, straddling said second longitudinal direction side face and two lateral side faces, wherein;
    a first space pattern is formed on said first lead portion at a position along with said first longitudinal direction side face which is not connected with said first terminal electrode,
    said first space pattern is formed at a center position of said first longitudinal direction side face,
    a ratio of L1/L0 is within a range of 0.2 to 0.5 in case that a longitudinal width of said first space pattern is L1, and a longitudinal width of said dielectric body is L0,
    a ratio of L0/W0 is within a range of 1.6 to 3 in case that a longitudinal width of said dielectric body is L0, and a width of lateral direction of said dielectric body is W0,
    a ratio of W1/W0 is within a range of 0.25 to 0.4 in case that a width of the first lead portion led out to the lateral direction side face of said dielectric body is W1,
    a plane pattern of said first internal conductor layer having said first space pattern is line symmetry pattern to a centerline passing through a longitudinal middle portion of said dielectric body,
    a second space pattern which is not connected with said second terminal electrode, is formed on said second lead portion at a position along with said second longitudinal direction side face,
    said second space pattern and said first space pattern have same shape and same size, and
    a width of space W2 of the first space pattern is comparable to a width of space of an insulating space, and W2 is 100 to 200 µm.

2. The multilayer capacitor as set forth in claim 1, wherein other space patterns are formed on said first lead portion along with said first longitudinal direction side face, other than said first space pattern.

3. The multilayer capacitor as set forth in claim 1, wherein said first internal conductor layer and said second internal conductor layer have a same plane pattern when rotating 180 degrees.

* * * * *